Figure 1:
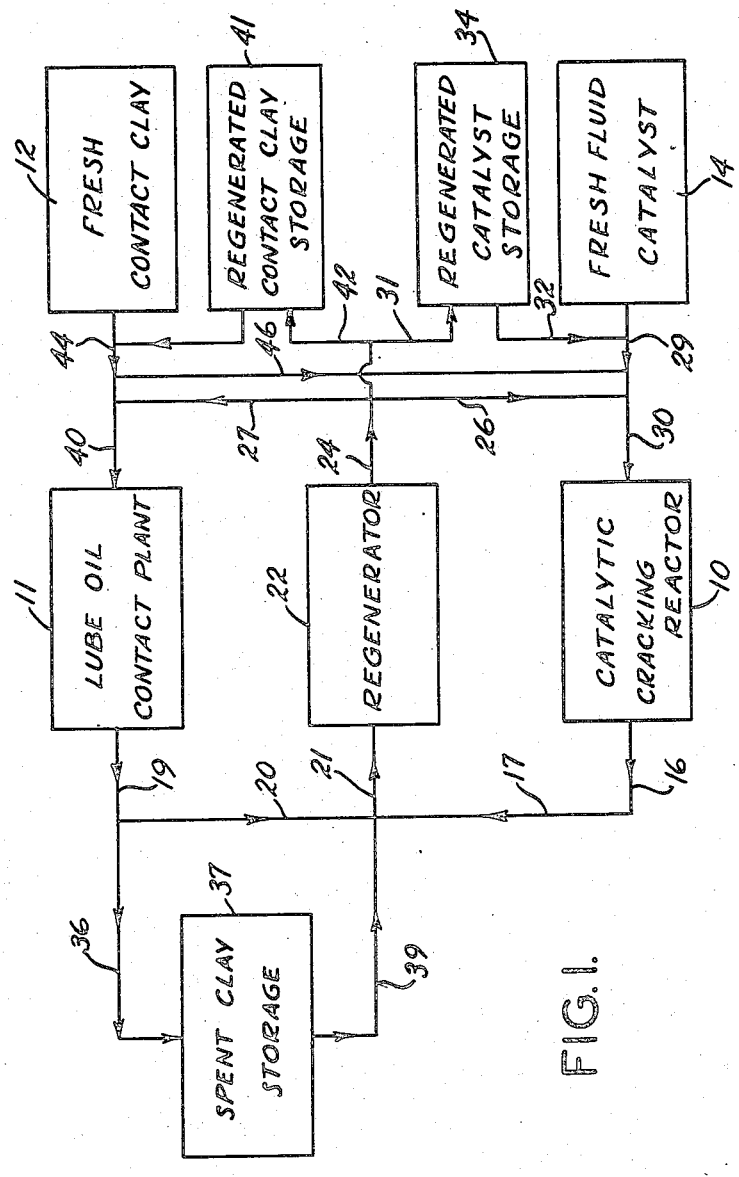

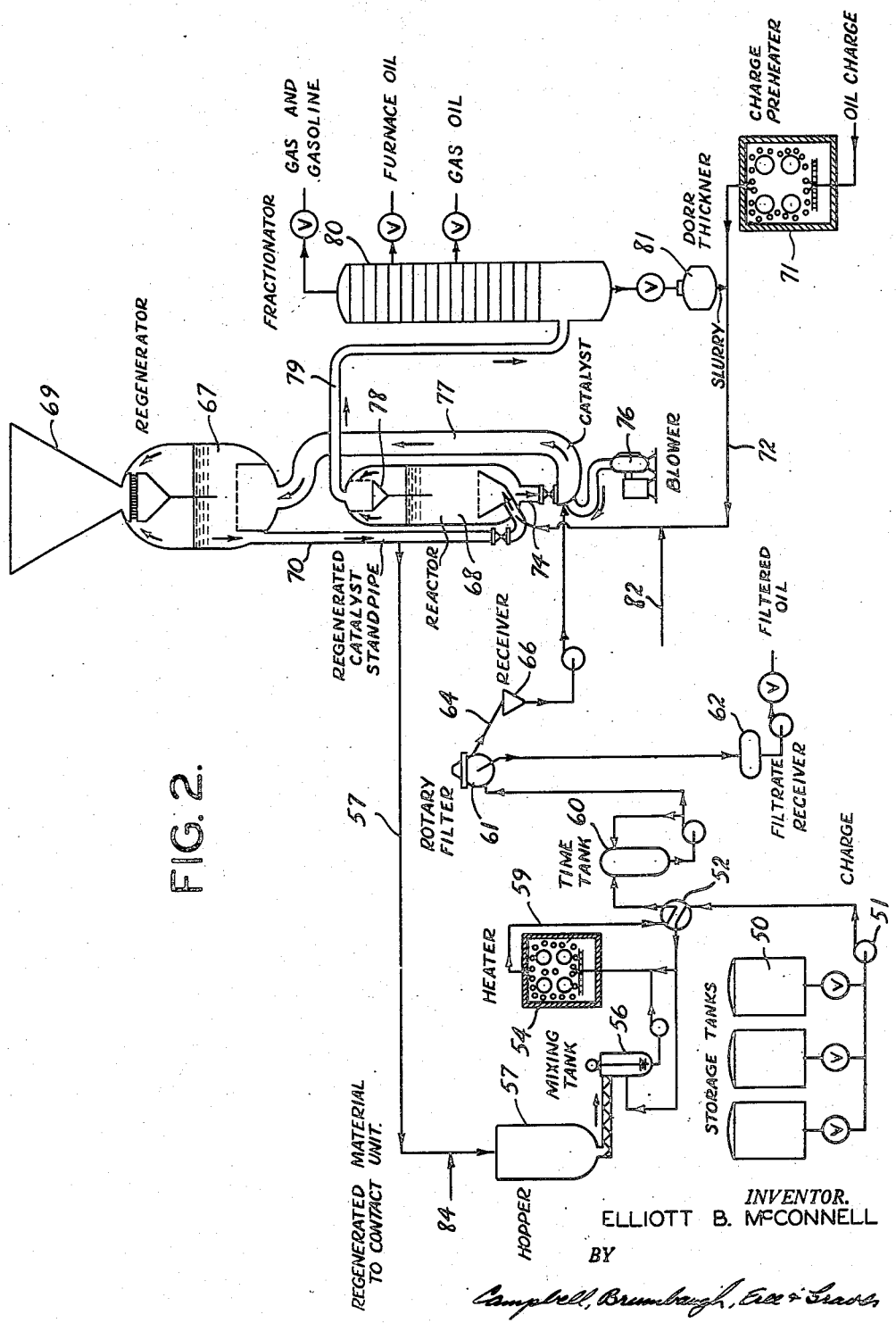

Patented Jan. 19, 1954

2,666,732

UNITED STATES PATENT OFFICE 2,666,732

METHOD OF TREATING HYDROCARBONS WITH A DOUBLE-FUNCTION CATALYST

Elliott B. McConnell, Shaker Heights, Ohio, assignor to The Standard Oil Company, Cleveland, Ohio, a corporation of Ohio Application February 12, 1949, Serial No. 76,104

4 Claims. (Cl. 196—52)

My invention relates to a method of treating hydrocarbons with an adsorbent contact material and a cracking catalyst and more particularly to a combination of contact adsorption and catalytic cracking processes that may, if desired, be widely spaced in time and distance, wherein the regenerator for the cracking catalyst is utilized not only to regenerate the catalyst but also to regenerate the adsorbent contact material for further use in either or both the contact or cracking operations.

It has been known that it is possible to burn off spent contact clay but it has, to the best of my knowledge, been considered necessary to conduct such an operation in a furnace constructed for that purpose. This practice is generally not deemed economical, however, because the initial and maintenance costs of such a furnace are not warranted in view of the low cost of contact clays. In accordance with my invention, the regenerator of a catalytic cracking unit is used to regenerate the spent contact material. This method is economical because the regeneration can be carried out without necessitating additional equipment.

To cite an illustrative example without, however, intending to limit the scope of this invention thereto, the principles of this invention may be applied to the decolorization of lubricating oils and to the cracking of hydrocarbons to form gasoline. By such an application it is possible to utilize the regenerator of a catalytic cracking reactor not only for the regeneration of cracking catalyst but, in addition, for the regeneration of lubricating oil contact material.

The terms "adsorbent contact catalytic material" and "contact material," as used herein, refer to materials having adsorbent properties as well as catalytic activity.

I have found that the contacting of lubricating oils with adsorbent contact material has no deleterious effect upon the ability of the material to be regenerated in a regenerator normally used solely to regenerate catalytic material used in a catalytic cracking operation and that such regenerated contact material is substantially equally suitable for further use in either an adsorption or cracking operation.

The present invention, therefore, contemplates a method wherein spent contact material from an adsorption process and catalyst from a catalytic cracking operation may both be regenerated in a given regenerating unit. The material utilized in the adsorption process may be the same or different from that used in the cracking operation, depending upon the requirements described more fully hereinafter.

In one embodiment of the invention, the same material is utilized as catalyst in the catalytic cracking reactor and in the lube oil contact plant, the material leaving the reactor and the contact plant being regenerated in a common regenerator and recycled to the reactor and contact plant.

In another embodiment, where the adsorption material and catalyst are different materials, the spent contact material and used catalyst are regenerated cyclically in a common regenerator. In this embodiment, the contact plant is run continuously on contact material and the cracking reactor is run cyclically on catalyst and contact material.

One of the advantages of this invention is that it provides a simple and economical means for regenerating contact materials known primarily for their adsorbent properties. Another advantage of the invention is that the regenerating capacity of an existing regenerator, hitherto used solely for the regeneration of spent catalyst from a cracking operation, may be utilized more fully and that spent contact material hitherto uneconomical to regenerate may now be regenerated without the addition of more equipment.

Another advantage of the invention is that it may be utilized for the treatment of any lubricating oil whether it be unrefined, solvent treated or acid treated.

Still another advantage of the invention is that it makes possible appreciable economies in the operation of a contact plant, cracking plant, or both.

The contact material employed in the method of this invention may be any material known to have adsorptive as well as catalytic properties. The preferred material includes the silica-alumina type catalysts commonly referred to as contact clays, such as members of the group of acid-activated, natural clays made from the mineral montmorillonite, available from the Filtrol Corporation and marketed under trade names such as "Filtrol" and "Super Filtrol" lube contact clays as well as fluid catalysts of the natural clay type available under the trade name "Filtrol D" and fluid catalysts made synthetically by precipitating alumina and silica, which are available as the spray-dried and oil dropped "Microsphere" type and "Diakell" catalysts available from The Universal Oil Products Company and M. W. Kellogg Company, respectively.

The various embodiments of the invention are further described in the following examples made with reference to the accompanying drawing wherein:

Figure 1 is a diagrammatic flow sheet; and
Figure 2 is a flow sheet illustrating one preferred embodiment of the method of this invention.

EXAMPLE 1

When the operation of the cracking unit is such that a fluid type catalyst is required, one method of procedure, which is herein described with reference to Figure 1, is to operate both a catalytic cracking reactor 10 and a lube oil contact plant 11 on the fluid catalyst, the make-up requirements being obtained from a source 14. In this embodiment, the stream 16, 17 of fluid catalyst from catalytic cracking unit 10 is combined with a stream 19, 20 of catalyst from the contact plant 11 into a single stream 21. The combined stream 21 of catalyst then enters regenerator 22 and the regenerated catalyst leaves the regenerator in the form of a single stream 24, which is divided into two streams 26 and 27 for recycling to the catalytic cracking unit 10 and the contact plant 11. The make-up catalyst required passes directly from source 14 into the cracking unit 10 in the form of a stream 29, 30.

The advantage of this type of operation is that the regenerator 22 is made available for regeneration of the catalyst used as adsorbent in the contact plant as well as for the regeneration of the catalyst coming from the catalytic cracking reactor without in any way interfering with the operation of the cracking reactor under optimum conditions.

EXAMPLE 2

When it is desired to operate the catalytic cracking reactor, for at least part of the time, with fluid catalyst and it is preferred to operate the contact plant with a contact clay, as might well be the case when the contact plant and the cracking unit are at a considerable distance from one another, the system is operated cyclically.

In one cycle, a stream 16, 17, 21 of catalyst from cracking reactor 10 is led to the regenerator 22. The regenerated catalyst is then recycled to the catalytic cracking reactor 10 in the form of a stream 24, 31, 32, 29, 30 and by way of regenerated catalyst storage 34, make-up catalyst being supplied to the cracking reactor from source 14 in the form of a stream 29, 30.

In the meantime, the lube oil contact plant 11 operates on contact clay and a stream 19, 36 of spent contact clay from the contact plant is led to a spent clay storage zone 37.

When the storage zone 37 has been filled, the spent clay is directed into regenerator 22 in the form of a stream 39, 21. The regenerated contact clay is then recycled to contact plant 11 in the form of a stream 24, 27, 40, to the cracking reactor 10 in the form of a stream 24, 26, 30, and the excess regenerated clay is passed to regenerated contact clay storage 41 in the form of a stream 24, 42. Any fresh contact clay required for make-up may be supplied from source 12 in the form of a stream 44, 40. When the spent clay storage 37 has been substantially emptied, the flow of spent clay to the regenerator is stopped and the cycle is repeated by operating the cracking reactor on regenerated catalyst from storage 34 and fresh make-up catalyst from source 14 and operating the contact plant on regenerated contact clay from storage 41 and fresh make-up clay from source 12.

This method of procedure has the advantage peculiar to it of permitting regeneration of spent contact clay by the fuller utilization of the regenerator 22 and without the addition of appreciable equipment. It is applicable whether the cracking reactor and the contact plant be in approximately the same physical location or at widely separated points. Furthermore, it has the advantage of reducing the overall volume of fluid catalyst circulating in the system inasmuch as none of it is circulated through the contact plant system.

EXAMPLE 3

Where the requirements of the catalytic cracking reactor are not such as to require fluid catalyst but can be satisfied by use of contact clay alone, the method of procedure is essentially similar to that of Example 1 except that the supply of make-up clay may be varied.

Thus, for example, fresh contact clay, from source 12 and in amounts sufficient to supply the make-up requirements, may be added to either the contact plant 11 in the form of a stream 44, 40 or directly to the catalytic cracking reactor 10 in the form of a stream 44, 46, 30, or to both the contact plant and the cracking reactor.

This procedure and the variations thereof referred to has the advantage of utilizing to the fullest the regenerating capacity of the regenerator 22.

Referring now to Figure 2 of the drawing, there is illustrated a preferred embodiment of the invention distinguished by the fact that the regenerator is utilized continuously to regenerate the contact material from both a cracking reactor and an adsorption plant for decolorizing raw, solvent refined or acid treated oil.

In this embodiment, a portion of the oil from storage tanks 50 is passed by means of pump 51 through a heat exchanger 52 directly to a heater 54 and another portion is passed to the heater 54 by way of a mixing tank 56. Contact material from a hopper 57 is introduced into the mixing tank 56 and from there passed into the heater 54 with the second portion of the oil to be treated. The heated mixture leaves the heater 54 by way of line 59, passes through the heat exchanger 52 and is introduced into a time tank 60 to allow a predetermined time of contact between the contact material and the oil. From the time tank 60 the mixture is passed into a rotary filter 61 from whence the filtrate passes into a filtrate receiver 62 and ultimately to a receiver for filtered oil. The spent contact material leaves the rotary filter 61 by way of line 64, passes through a receiver 66 and is pumped into the regenerator 67 together with material from the reactor 68.

The gaseous effluents from the regenerator 67 are passed through a separator indicated schematically at 69. As in conventional practice, the regenerated contact material leaves the regenerator 67 by way of line 70. A portion of the regenerated contact material is withdrawn from line 70 and recycled to the hopper 57 for further use in the contact plant.

The oil charge to be subjected to catalytic cracking is passed through a charge preheater 71 and introduced by way of line 72 into the reactor 68 together with the regenerated contact material remaining in line 70. The material from the reactor 68 leaves at 74 and is recycled by the action of a blower 76 and together with the spent contact material from the contact plant through line 77 to the regenerator 67.

As in conventional practice, the reaction products from reactor 68 leave the reactor at the top by way of a separator 78 and line 79 and pass into a fractionator 80 wherein they are resolved into fractions of gas and gasoline, furnace oil, gas oil and a slurry that is recycled to the reactor 68 by way of thickener 81 and line 72.

Contact material in amounts sufficient to satisfy the make-up requirements may be introduced into the system at any desirable point such as at 82 or 84.

Tests have revealed that the catalytic activity, as determined by the standard "Cat A" test, of commercially available lubricating oil contact clay is 30 or over, and therefore sufficient to be used as a make-up catalyst to a fluid catalytic cracking unit. A comparison of the catalytic activity of one typical lubricating oil contact clay with two high activity fluid catalysts is given in Table 1 below:

TABLE 1

*Catalytic activity of various lube oil contact clays and fluid catalysts*

| Experiment No. | Material | "Cat A" activity |
|---|---|---|
| 16891-93 | "Filtrol" lube contact clay (X-417) | 33.1 |
| 16927-29 | Kellogg "Diakell" fluid catalyst | 40.7 |
| 16931-33 | "Filtrol" grade D fluid catalyst | 41.5 |

Tests have also shown that the ability of cracking catalysts to decolorize crude lubricating oil is comparable to the ability of cheaper contact clays of lesser catalytic activity. The results of such tests are listed in Table 2, the optical density listed in the last three columns being that of 1000 grams of solvent extracted bright stock having a viscosity of 120 SUS at 210° F. treated for 30 minutes at 450° F. with the stated amounts of fresh material, i. e., material not previously used for either lubricating oil contacting or catalytic cracking.

TABLE 2

| Material | Optical density | | |
|---|---|---|---|
| | 5 lbs./bbl. (1.5 weight percent) | 10 lbs./bbl. (3.0 weight percent) | 15 lbs./bbl. (4.5 weight percent) |
| "Super Filtrol" lube contact clay | 159.0 | 127.3 | 111.5 |
| "Filtrol" lube contact clay (X-417) | 203.0 | 144.0 | 93.0 |
| Kellogg "Diakell" fluid catalyst | 147.2 | 146.0 | 89.0 |
| "Filtrol" grade D fluid catalyst | 148.0 | 110.3 | 88.2 |
| U. O. P. spray dried "Microspheres" fluid catalyst | 154.0 | 114.2 | 120.5 |
| U. O. P. oil dropped "Microspheres" | 178.2 | 203.0 | 144.0 |

Tests have been made to compare the effectiveness, as a lubricating oil contact clay, of a regenerated catalyst from a cracking operation and have shown that the adsorbing ability thereof is not materially affected thereby. Thus, for example, the optical density of 1000 grams of solvent extracted bright stock, having a viscosity of 120 SUS at 210° F. and treated for thirty minutes at 450° F. with 10 lbs. per barrel of regenerated Kellogg "Diakell" fluid catalyst, was 153 whereas the optical density of a similar amount of the same oil treated in the same manner with fresh Kellogg "Diakell" fluid catalyst was 146.

The catalyst activity was determined by the standard "Cat A" procedure and the materials used for clay contacting were blown dry with air prior to running the "Cat A" tests.

The term "optical density" in the present disclosure represents the standard logarithmic ratio of intensity of an incident ray falling on a transparent or translucent medium to the intensity of the transmitted ray for a sample length of one meter and light of wave length from 5100 to 5500 Angstroms.

It is to be understood that innumerable variations and modifications will immediately become apparent to those skilled in the art upon reading the foregoing disclosure. The invention contemplates all such variations and modifications as come within the scope of the appended claims.

I claim:

1. A method of treating hydrocarbons which comprises contacting a lubricating oil in the liquid phase in a contact zone with a first stream of adsorbent silica-alumina contact catalytic material having both adsorbent and catalytic cracking properties and being in finely divided powder form for decolorizing said lubricating oil, cracking hydrocarbons in a fluid catalytic cracking zone by contact with a second stream of adsorbent silica-alumina contact catalytic material likewise having both adsorbent and catalytic cracking properties and being in a finely divided powder form, passing all of the silica-alumina contact catalytic material in said first and second streams from said contact and cracking zones, respectively, directly into and through a fluidized regeneration zone for regeneration of the adsorbent and catalytic properties of the contact catalytic material in both said streams, recycling one portion of said regenerated contact catalytic material directly to the contact zone, and recycling the remainder of said regenerated contact catalytic material direcly to the fluid catalytic cracking zone.

2. The method defined in claim 1 in which the contact catalytic material in the first and second streams and the material regenerated in the fluidized regeneration zone is a synthetic silica-alumina fluid catalyst.

3. The method defined in claim 1 in which the contact catalytic material in the first and second streams and the material regenerated in the fluidized regeneration zone is a natural silica-alumina contact clay.

4. The method defined in claim 1 in which the contact catalytic material in the first stream and said one portion of regenerated contact catalytic material recycled to the contact zone is a silica-alumina contact clay and the contact catalytic material in the second stream and said reminder of the regenerated contact catalytic material recycled to the fluid catalytic cracking zone is a silica-alumina fluid catalyst.

ELLIOTT B. McCONNELL.

References Cited in the file of this patent

UNITED STATES PATENTS

| Number | Name | Date |
|---|---|---|
| 2,091,892 | Stratford | Aug. 31, 1937 |
| 2,227,416 | Payne | Dec. 31, 1940 |
| 2,286,654 | Simpson et al. | June 16, 1942 |
| 2,361,978 | Swearingen | Nov. 7, 1944 |
| 2,409,234 | Arveson | Oct. 15, 1946 |
| 2,410,436 | Ewing | Nov. 5, 1946 |
| 2,426,903 | Sweeney | Sept. 2, 1947 |
| 2,450,724 | Grote | Oct. 5, 1948 |
| 2,464,127 | Gary | Mar. 8, 1949 |
| 2,549,518 | Perry | Apr. 17, 1951 |